Patented Sept. 4, 1923.

1,466,819

UNITED STATES PATENT OFFICE.

HENRY DREYFUS, OF LONDON, ENGLAND.

MANUFACTURE OF PLASTIC MASSES.

No Drawing. Application filed November 2, 1920. Serial No. 421,238.

*To all whom it may concern:*

Be it known that I, HENRY DREYFUS, a citizen of the Swiss Republic, of London, England, have invented certain new and useful Improvements in or Relating to the Manufacture of Plastic Masses, of which the following is a specification.

This invention has reference to the manufacture of celluloid-like masses of any kind having a basis of cellulose acetate wherein high boiling solvents, called plasticisers, for the cellulose acetate, are incorporated with the mass in conjunction with one or more volatile liquids or diluents.

In the operation of kneading or incorporating the cellulose acetate with the high boiling solvents or plasticisers (with or without other usual or suitable ingredients) in the kneading or mixing apparatus, considerable difficulty is experienced and much power expended, in obtaining a homogeneous mass in which the plasticiser is uniformly distributed, especially when relatively small quantities of plasticiser are used, owing to the fact that the volatile liquids and plasticisers act irregularly and locally on the mass in the mixing, with the result that the cellulose acetate is unevenly and not homogeneously attacked, and that some parts of the cellulose acetate are dissolved whilst others are not penetrated and dissolved, or are only partially penetrated and dissolved, so that unattacked lumps or "eyes" form in the mass and are more or less difficult to get rid of.

Now according to the present invention, in order to obviate or reduce this difficulty, the kneading or mixing of the cellulose acetate with the high boiling solvents or plasticisers (with or without other usual or suitable ingredients) is effected in the presence of such excessive quantities of a volatile liquid or liquids,—such for instance as ethyl or methyl alcohol or mixtures thereof, which liquids or mixtures are themselves no solvents or are not good solvents for the cellulose acetate at ordinary or raised temperatures, (though in certain reduced quantities together with the plasticiser they may exert a solvent action on the acetate),—that during the mixing or kneading the plasticisers or high boiling solvents are present in so dilute a state that their solvent action on the cellulose acetate is prevented or more or less reduced and the mass can be easily kneaded or mixed to incorporate the constituents homogeneously and distribute the plasticisers uniformly throughout the mass so that the cellulose acetate is homogeneously impregnated by the plasticiser diluted in the volatile liquid or liquids as a vehicle or carrier, after which the volatile liquids or diluents are evaporated or expelled, and in proportion as this is effected the solvent action on the cellulose acetate increases so that this is more and more dissolved and plasticised until finally not any or only very little volatile diluent remains in the concentrated or stiff celluloid solution.

By means of this process it may even be possible to dispense with the rolling operation ordinarily employed in the celluloid industry to obtain further mixing.

The invention is not confined to the use of any particular plasticisers together with the volatile diluents as described above.

By way of example I may employ as high boiling solvents or plasticisers the alkylated sulphonamide substances specified. By way of example I may employ as high boiling solvents or plasticisers the alkylated sulfonamide substances specified in my U. S. Patents 1,353,384 and 1,353,385, such as the mixture of xylene monalkyl sulfonamids or of the corresponding dialkyl bodies, or the mixture of toluene monoalkyl sulfonamids, and the invention is particularly advantageous when using the monalkylated substances therein described, but any other high boiling solvents or plasticisers may be employed, preferably such as fulfill the conditions set out in my U. S. Patent 1,353,384.

Mixtures of different high boiling solvents or plasticisers may of course be employed together with the volatile diluent or diluents in practising the invention, or only one plasticiser with the diluent or diluents.

For general purposes the most suitable volatile diluents to employ are ethyl and methyl alcohols or mixtures thereof. For some purposes, however, for example when the plastic masses are to be used for electric insulation and the presence of moisture in the mass has to be avoided as much as possible, it is of advantage to employ benzene or other volatile liquids or mixtures which are free from water, such liquids or mixtures however being themselves no solvents for cellulose acetate at ordinary or raised temperature as before explained; the cellulose acetate in such cases is preferably dried free of moisture (preferably even free from its natural moisture) before the mixing operation.

The following examples will serve to illustrate how the invention may be carried into effect, it being understood that these are given only by way of illustration and that they can be varied considerably within the spirit of the invention. The parts are by weight.

*Example 1.*

| | Parts. |
|---|---|
| Cellulose acetate | 100 |
| Mixed isomeric xylene mono-ethyl or mono-methyl sulphonamides according to U. S. Patent 1,353,384 | 30 |
| Ethyl or methyl alcohol or mixtures thereof | 200 |

*Example 2.*

| | |
|---|---|
| Cellulose acetate | 100 |
| Toluene-o-monoethyl sulphonamide or mixtures of *o* and *p* monomethyl or monoethyl sulphonamides according to U. S. Patent 1,353,385 | 25 |
| Benzene | 150 |

Any other usual or suitable ingredients may be added in these examples according to the character of the product required.

The mixing may be effected in any appropriate closed kneading or mixing apparatus such as known in the celluloid industry, provided with means for preventing loss of the volatile liquid by evaporation, and when the mass has been homogeneously mixed the volatile liquids can be exhausted or evaporated off or otherwise removed, and be recovered by known means.

It is to be understood that plastic masses made according to the invention may be further worked up to celluloid-like products or other desired products without dilution, or they may be diluted afterwards in order to obtain solutions or compositions of the requisite fluidity or other suitable consistency for the particular purposes in view.

What I claim and desire to secure by Letters Patent is:—

1. Process for the manufacture of plastic masses comprising cellulose acetate and a plasticiser which comprises mixing the materials in the presence of such an excessive quantity of volatile diluent having characteristics as hereinbefore indicated, that during the mixing operation, the plasticiser is present in so dilute a state that its solvent action on the cellulose acetate is restrained and the mass can be easily mixed until homogeneously incorporated with the plasticiser and volatile diluent, whereafter the volatile diluent is evaporated, and in proportion as this proceeds the solvent action of the high boiling solvent on the cellulose acetate increases, so that said acetate is progressively dissolved and plasticised, substantially as described.

2. Process for the manufacture of plastic masses having a basis of cellulose acetate together with a high boiling solvent characterised in that the incorporating together of the cellulose acetate and the plasticiser is effected in presence of such excessive quantities of a volatile diluent which is not a good solvent of cellulose acetate, that during the incorporating action the high boiling solvents are present in so dilute a state that their solvent action on the cellulose acetate is at least greatly reduced, and the mass can be easily mixed until the constituents are homogeneously incorporated with the high boiling solvent and the diluent, whereafter the volatile diluent is removed, and in proportion as this proceeds, the solvent action of the high boiling solvent on the cellulose acetate increases so that said acetate is progressively dissolved and plasticised, substantially as described.

In testimony whereof I have hereunto subscribed my name.

HENRY DREYFUS.